United States Patent Office 2,855,386
Patented Oct. 7, 1958

2,855,386

OXETANE POLYMERS

Tod W. Campbell, Wilmington, Del., assignor to E. I. du Pont de Nemours and Company, Wilmington, Del., a corporation of Delaware No Drawing. Application June 21, 1955
Serial No. 517,050

8 Claims. (Cl. 260—78)

This invention relates to a novel product and to a process for its preparation. More particularly, it is concerned with a synthetic polymer wherein recurring units are linked through amide nitrogen, a process for its production and the shaped articles formed therefrom.

By the expression ". . . a synthetic polymer wherein recurring units are linked through amide nitrogen" is meant a member of the class comprising polyamide, polyurethane, polyurea, polythiourea and polysulfonamide. The nitrogen linkages between the recurring units may be represented as:

wherein

is a member of the class consisting of

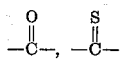

and

and R″ is hydrogen, lower alkyl and lower alkylene when the diamine has a ring structure, such as in the case of piperazine.

It is an object of the present invention to provide a novel synthetic polymer wherein recurring units are linked through amide nitrogen.

Another object is to provide a thermosetting shaped article produced from a polymer wherein recurring units are linked through amide nitrogen.

A further object is to provide a process for the production of a thermoset shaped article fabricated from a polymer wherein recurring units are linked through amide nitrogen.

These and other objects will become apparent in the course of the following specification and claims.

In accordance with the present invention, a polymer is provided containing units of the structure:

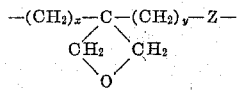

$x$ and $y$ are integers of from 1 to 2 and —Z— is a radical of the class consisting of

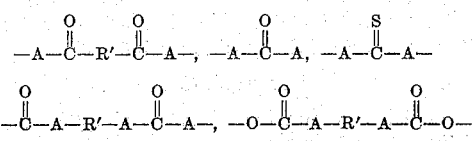

and $$-A-\overset{O}{\underset{\|}{C}}-O-R'-O-\overset{O}{\underset{\|}{C}}-A-$$

and $$-A-\overset{O}{\underset{O}{\overset{\|}{S}}}-R'-\overset{O}{\underset{O}{\overset{\|}{S}}}-A-$$

—R′— being a divalent organic radical and —A— being a member of the class consisting of

and -piperazino-, —R being a member of the class consisting of —H and -lower alkyl. The polymer described above is produced by employing as a complementary component in a low temperature polymerization a compound of the formula

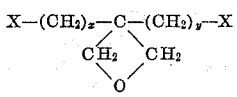

wherein —X is a radical of the class consisting of—NHR and OH, and $x$ and $y$ have the connotations listed above. Such materials can be produced from 3,3-bis(bromomethyl)oxacyclobutane prepared by treatment of pentaerythritol with HBr in acetic acid, followed by isolation of the product and reaction with alcoholic alkali as taught by Beyart and Govaert, Chemical Abstracts, 34, p. 5414 (1940). The dibromo derivative may be reacted with ammonia or a primary mono- or polyamine to form a primary or secondary amine. Alternatively it may be reacted with KCN to form the dinitrile which may thereafter be reduced to the amine by catalytic hydrogenation. After fabrication of a shaped article from the polymer, it may be thermoset by heating.

The products of the present invention have obvious utility in conventional textile applications, such as the production of staple, flock, thread, yarn, fabric, batts, filling, pellicles, heat and solvent resistance coatings, molded objects and the like.

The following examples are cited to illustrate the invention. They are not intended to limit it in any manner.

*Example I*

A solution of 2.37 parts of 3,3-bis-(aminomethyl)-oxacylobutane and 4.6 parts of redistilled triethylamine dissolved in 33 parts of purified chloroform is added to a Waring Blendor agitated solution of 4.14 parts of terephthaloyl chloride in 100 parts of chloroform. The polymer forms immediately and precipitates as a curdy, swollen mass. It is thereafter redissolved by the addition of a little methanol to the mixture, reprecipitated by the addition of hexane, filtered, washed in turn with ethanol and water and dried. The polymer does not melt at temperatures up to 300° C. and is soluble in chloroform-methanol mixtures, cresol and formic acid. The inherent viscosity of a 0.5% solution of the polymer in formic acid is 1.96. A formic acid solution containing 30% by weight of the polymer is cast on a glass plate. A clear, moderately tough film, completely soluble in formic acid, forms after drying 24 hours at 25° C. Fifteen and thirty minute heatings of samples of the dried film at 100° C. produced no apparent change in solubility. However, 45 minutes heating at 100° C. reduces the solubility so that some insoluble gels remain upon treatment of the film with formic acid. The film is completely insoluble in formic acid after it is heated at 100° C. for 60 minutes.

A sample of the original, non-thermoset film is cut into thin strips. Several of these strips are drawn at 80° C. to twice their cut length and are thereafter rendered insoluble in common chemical solvents by being heated in air for two hours at 140° C. Examination under a polarizing microscope discloses a high degree of orientation in the drawn strips both before and after thermosetting. The drawn and undrawn strips are observed from X-ray observations to be amorphous both before and after thermosetting.

*Example II*

2.37 parts of 3,3-bis(aminomethyl)oxacyclobutane and 4.6 parts of redistilled triethylamine are dissolved in 33 parts of purified chloroform. This solution is added to a Waring Blendor agitated solution of 3.81 parts of adipyl chloride in 100 parts of chloroform. The polymer forms immediately, is filtered from the reaction mixture, washed with ethanol and water in turn, and dried. It displays no melting point but changes to a rubbery material at about 170° C. It is water-soluble. A film is cast from a formic acid solution containing 35% by weight of the polymer. The film so formed is 100% soluble in formic acid. After heating 8 hours at 100° C. the film is insoluble in formic acid.

*Example III*

2.37 parts of 3,3-bis(aminomethyl)oxacyclobutane plus 4.6 parts of redistilled triethylamine in 33 parts of purified chloroform are slowly added to a Waring Blendor agitated solution of 4.97 parts of sebacyl chloride in 100 parts of chloroform. The precipitated, curdy, swollen mass of polymer is filtered and washed with ethanol, water and then dried. It does not have a definite melting point but changes to a soft rubbery compound at around 170° C. It is soluble in formic acid and insoluble in a chloroform methanol mixture. It is rendered infusible and insoluble in formic acid by thermosetting.

*Example IV*

2.53 parts of 3,3-bis(aminomethyl)oxacylobutane in 16 parts of dimethyl formamide are mixed with a solution of 3.97 parts of toluene diisocyanate in 16 parts of dimethyl formamide. The reaction is exothermic. After one hour an aliquot portion of the reaction mixture is poured into water and the polymer filtered out and washed. The yield is about 90%. The polyurea has an intrinsic viscosity in formic acid of 1.3. A portion of the original solution is cast to give a clear, coherent, brittle film. It is rendered insoluble in common organic solvents by heating 60 minutes at 100° C.

*Example V*

10 parts of 3,3-bis(cyanomethyl)oxacyclobutane are dissolved in 30 parts of dioxane and hydrogenated over Raney Cobalt at 2000 p. s. i. until the adsorption of hydrogen ceases. The product is distilled under vacuum and the 3,3-bis(betaaminoethyl)oxacyclobutane obtained is 45% yield. It is a thick oil with a boiling point of 152° C. at 1.5 mm. of Hg.

The aminoethyl derivative so prepared is substituted for the aminomethyl derivative of Example II. The film formed is rendered insoluble in common organic solvents by being thermoset.

*Example VI*

Thirty parts of poly(tetramethylene oxide)glycol having a molecular weight of 1000 and 3.1 parts of 2,4-toluene diisocyanate are heated in a 3-necked glass flask under a blanket of nitrogen with stirring for 3 hours at 85° C. A solution of the trimer of the glycol is formed. To this solution is added 5 parts of methylene bis-4 phenyl isocyanate. The mixture is heated with stirring for 1 hour at 85° C. The reaction mixture, containing a macromolecular diisocyanate, is cooled to room temperature and 8.75 parts of methylene bis-4 phenyl isocyanate and 103 parts of dimethylformamide are added. A homogeneous solution forms upon stirring. A solution of 1.17 parts of 2,5-dimethyl piperazine and 3.48 parts of 3,3-bis(aminomethyl)oxacyclobutane in 103 parts of dimethylformamide is then added. After 15 minutes stirring the copolyurea-polyurethane is precipitated by pouring the reaction mixture into water. The polymer is filtered, washed with ethanol, and dried to give a yield of 95%. The inherent viscosity of a 0.5% solution of the polymer in m-cresol at 25° C. is 2.03. The copolymer contains one mole of poly-(tetramethylene oxide)-toluene diurethane units, 0.5 mole of dimethylpiperazine methylene bis-4 phenyl urea units and 3.0 moles of 3,3-bis(aminomethyl)oxacyclobutane methylene bis-4 phenyl urea units.

A dimethyl formamide solution containing 15% by weight of the polymer as prepared above is cast on a glass plate and dried over night in a 70° vacuum oven. A portion of the film is cross-linked by heating 15 minutes at 180° C. The infra-red absorption spectrum in the region of 10.3 microns of this heated film shows that 75–100% of the oxacyclobutane rings present in the original film have been opened. This absorption band is selected on the basis of a study of oxacyclobutane monomers and model compounds of polymers containing an oxacyclobutane ring. The heated film is insoluble in dimethyl formamide. The stress on the cross-linked film decays only 33% in 1000 minutes at 100% elongation as contrasted with 46% for the original film. The above cross-linked film recovers 80% of its initial length after being held at 100% elongation for 1000 minutes while the original film recovers only 70% of the elongation under the same conditions.

A concentrated solution of non-thermoset polymer as prepared above in dimethylformamide is extruded at a temperature of 30° C. through a 10-hole spinneret (hole diameter of 0.005 inch) into water at room temperature the solution being extruded at a jet velocity of 400 inches per minute. The yarn is led through the bath for a total of 24 inches, the yarn being subjected during its travel to a tension of 1.2 grams per denier by means of a snubbing tension guide comprising two stationary pins mounted at a distance of 16 inches from the spinneret space. On leaving the bath the yarn is passed without slippage about a positively driven feed roll possessing a peripheral speed of 800 inches per minute. The yarn being subsequently collected on a rotating bobbin possessing a constant peripheral speed of this same value. The bobbin pack is washed with water and air dried for 24 hours. After heating 1 hour at 100° C. the resultant strong yarn is insoluble in dimethylformamide.

*Example VII*

A solution of 1.89 parts of 3,3-bis(aminomethyl)oxacyclobutane dihydrochloride and 10 parts of 6 N NaOH in 100 parts of water are mixed with a solution of 2.35 parts of hydroquinone bischloroformate in 100 parts of purified chloroform in a Waring Blendor. The polymer forms immediately. It is filtered, washed with methanol and dried. It has an inherent viscosity of 0.28 in a 0.5% m-cresol solution. A film cast from a solution of this polymer is thermoset upon exposure to temperatures of about 100° C.

*Example VIII*

The polyurethane from 3,3-bis(aminomethyl)oxacyclobutane and ethylene bischloroformate is prepared by the process of Example VII. The polymer has an inherent viscosity of 0.41 in m-cresol. Shaped articles produced from it are thermoset by baking in air at elevated temperatures below the decomposition point.

*Example IX*

An emulsion comprising 80 parts of water, 0.8 part of sodium lauryl sulfate, 3.5 parts of 3,3-bis(aminoethyl)oxacyclobutane and 43.5 parts of xylene is prepared in a Waring Blendor. To this is added, simultaneously at about the same rate from two separate burettes and with constant agitation, a solution of 7 parts of metabenzenedisulfonyl chloride in 43.5 parts of xylene and a solution of 2 parts of sodium hydroxide in 50 parts of water. The addition is made over a period of about 2 minutes. Stirring is continued for about ten minutes thereafter. A coil of copper wire is dipped into the emulsion. After drying, the coated coil is baked in air at 100° C. for 30 minutes to thermoset the coating.

As pointed out above, the polymers of the present invention are thermosetting by virtue of the presence of the heat-rupturable oxacyclobutane ring and they contain amide nitrogen from the class consisting of the amide, sulfonamide, urea, thiourea and urethane linkages. The thermoset shaped article is apparently of cross-linked structure. The polymer may be prepared by the type reactions indicated below wherein R represents the radical

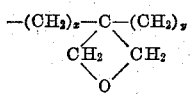

wherein $x$ and $y$ are integers of from 1 to 2, R' is an organic radical and $n$ is a large number:

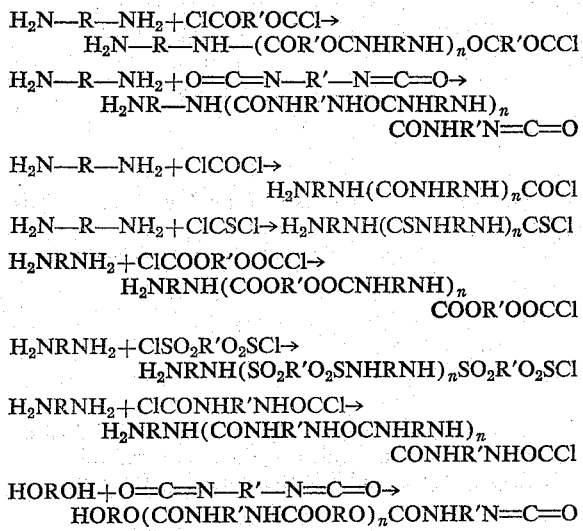

The temperature at which polymerization is accomplished must be low enough to avoid any substantial amount of rupture of the cyclic ether ring. Such rupture results in thermosetting, i. e., cross-linking, which renders subsequent fabrication of the polymer into shaped articles difficult. In general those techniques which permit polymerization at a temperature of 100° C. or less are satisfactory. The interfacial polymerization technique is preferred. It is a rapid, moderate temperature reaction in which the complementary reactants are brought together in such a way that the reaction zone is at, or is immediately adjacent to, a liquid-liquid interface. Thus, most of the molecules of at least one of the reactants must diffuse through liquid diluent to arrive at the reaction zone. The reactants in one liquid phase may be, for example, as illustrated above, one or more diamines and the reactant in the other liquid phase may be one or more diacid halides. If a hydrogen halide is evolved in the polymerization, an acid acceptor may be added to the reaction mass. The two liquid phases are mixed to form a two-phase system in which the diamine and the other reactants are in separate phases, at least one of which includes a liquid diluent. Preferably each reactant is a liquid under the reaction conditions or is dissolved in a diluent but one of the reactants may be gaseous or dispersed or suspended as a finely divided solid in a diluent which will dissolve it, at least partially. The phases are mixed until the desired condensation polymerization has taken place and then, if desired, the polymers obtained are isolated.

Solution polymerization at moderate temperature can also be used. This method involves dissolving each complementary reactant, for instance, a diamine and a diisocyanate or a bischloroformate in separate portions of the same solvent substantially inert to the reactants, and the mixing of these solutions to form a high molecular weight polymer. Other combinations of reactants such as a glycol and diisocyanate plus a suitable catalyst such as a tertiary amine, can be used.

The nature of the difunctional acid halide, isocyanate, chloroformate, sulfonyl halide or carbamyl chloride employed as the complementary reactant for the oxacyclobutane diamine or glycol is not critical. Among suitable materials may be mentioned the acid halides of succinic, adipic, suberic, sebacic, terephthalic, hexahydroterephthalic, isophthalic, phthalic, bibenzoic and 1,5-naphthalene dicarboxylic acid. Mixtures of such acid halides are satisfactory and they may be substituted with groups which do not interfere with the reaction. Useful complementary diisocyanates include such compounds as 2,4-toluene diisocyanate, m-phenylene diisocyanate, and hexamethylene diisocyanate. The bischloroformates of such dihydric alcohols as ethylene glycol, pentaglycol, 1,4-cyclohexanediol and bis-2,2-(4-hydroxy cyclohexyl)propane as well as such organic disulfonyl halides as the chlorides and bromides of aliphatic and aromatic disulfonic acids including m-benzene disulfonyl chloride, methylene bis-para benzene sulfonyl chloride, decane-1,10-disulfonyl chloride, hexane-1,6-disulfonyl chloride and the like and bis-chlorocarbamates of diamines such as 2,5-dimethylpiperazine and hexamethylene diamine, can be used.

The extent to which the final shaped article is cross-linked can be controlled by forming copolymeric materials, i. e., employing a non-rupturable diamine or glycol in place of part of the oxacyclobutane containing component or by employing complementary difunctional macromolecular units for part of the oxacyclobutane containing component. The nature of this copolymeric complementary constituent is not critical. The copolymeric diamines may be any primary or secondary aliphatic, alicyclic, heterocyclic, or aromatic diamine. As representative examples may be mentioned tetramethylene diamine, pentamethylene diamine, hexamethylene diamine, heptamethylene diamine, octamethylene diamine, piperazine, p-xylenediamine, 1,4-diaminecyclohexane, p-phenylene diamine and the like. In general it is desirable that the oxacyclobutane component comprise at least about 2 mol percentage of the final polymer to provide perceptible thermosetting.

The polymers can be shaped from solutions of the polymer by apparatus and processes generally known in the art, the detailed operating conditions being suitably modified according to the solvent employed. In fiber formation, wet spinning, as illustrated in the example is preferred. The solution may be extruded through a spinneret into a bath of coagulative liquid which is miscible with the solvent of the spinning solution and which will, by the extraction of the said solvent, coagulate the polymer in the spinning solution. Such coagulative mediums will be a chemically inert non-solvent for the polymer and will vary according to the solvent used. For example, with dimethyl formamide solutions of polymer the coagulative medium may comprise water, water-dimethyl formamide, alcohols, aqueous solutions of inorganic salts and the like. In this wet spinning type of process the stretching and the subsequent orientation of the polymers to improve tenacity resilience, etc., is preferably performed while the article is in the gel state, e. g., while it still contains a substantial amount of the coagulating bath liquid. In film formation the solution may be passed in from a hopper on to a metallic surface, such as an endless steel band, under the smoothing action of a doctor knife. The solvent is thereafter removed, utilizing a liquid coagulating bath. Dry spinning, casting and molding techniques as known in the art can also be used to shape articles of the polymer of this invention.

While the optimum temperature for thermosetting the shaped article will vary depending upon the nature of the polymer, the thickness of the shaped article and the like, a temperature of about 100° C. is usually satisfactory. Temperatures as high as about 160° C. are suitable where a shorter exposure period to heat is desired. The thermosetting set can be applied to either the molecularly oriented or unoriented structures.

Although in its preferred embodiment the invention utilizes heat to cross-link, i. e., thermoset the shaped article, other means of cross-linking may be used to afford a faster cross-linking rate or new and novel effects. For example, the surface of a drawn oriented filament formed of polymer of this invention may be cross-linked by passage through a heated Friedel-Crafts type of catalyst such as $BF_3$. By increasing or decreasing the contact time with the catalyst the thickness of the cross-linked sheath can be modified as desired. Small amounts of acidic compounds such as $SnCl_4$, $AlCl_3$ and $ZnCl_2$ can be incorporated in the polymer and the rate of cross-linking or curing thereby hastened over the rate obtained by heating alone.

This invention is of particular value in that it raises the polymer stick temperature of a fiber so that better ironability is obtained. The cross-linked structures formed from the polymers of this invention are more resistant to organic solvents. The introduction of lateral side groups and cross-links containing oxygen ether makes the polymer more hydrophilic and improves the dyeability and static properties of the shaped articles.

In summary, the present invention provides a high molecular weight linear polymer wherein recurring units are linked through amide nitrogen and which polymer contains at least one oxacyclobutane ring per chain. The invention also provides a cross-linked shaped structure produced from the oxacyclobutane containing linear polymer possessing amide nitrogen.

Many modifications will be apparent to those skilled in the art from a reading of the above without a departure from the inventive concept.

What is claimed is:

1. A polymer containing the recurring structure

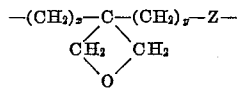

wherein x and y are integers of from 1 to 2 and —Z— is a radical of the class consisting of

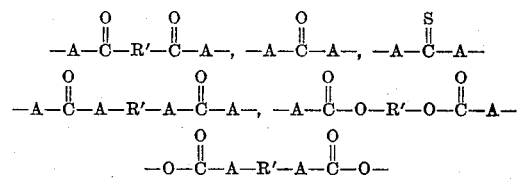

and

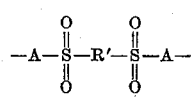

—R'—being a divalent hydrocarbon radical, and —A— being a radical of the class consisting of

and -piperazino-, —R being a radical of the class consisting of —H and -lower alkyl.

2. A polymer containing the recurring structure

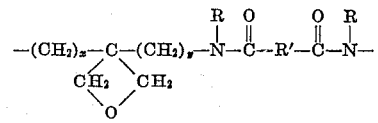

wherein x and y are integers of from 1 to 2, —R is hydrogen and —R'— is a divalent hydrocarbon radical.

3. A polymer containing the recurring structure

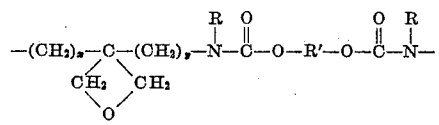

wherein x and y are integers of from 1 to 2, —R is hydrogen and —R'— is a divalent hydrocarbon radical.

4. A polymer containing the recurring structure

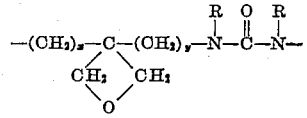

wherein x and y are integers of from 1 to 2 and —R is hydrogen.

5. A polymer containing the recurring structure

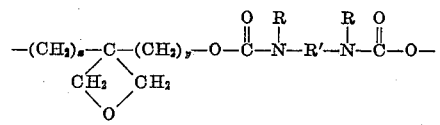

wherein x and y are integers of from 1 to 2, —R is hydrogen and —R'— is a divalent hydrocarbon radical.

6. A polymer containing the recurring structure

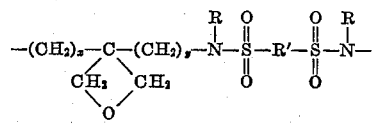

wherein x and y are integers of from 1 to 2, —R is hydrogen and —R'— is a divalent hydrocarbon radical.

7. A shaped article composed of the polymer of claim 1.

8. A cross-linked shaped article composed of the thermoset polymer of claim 1.

References Cited in the file of this patent

UNITED STATES PATENTS

| | | |
|---|---|---|
| 2,191,556 | Carothers | Feb. 27, 1940 |
| 2,722,520 | Hulse | Nov. 1, 1955 |

OTHER REFERENCES

Marrian: "Chemical Reviews," pages 149–202 (only page 163 relied upon), August 1948.